Patented Dec. 14, 1937

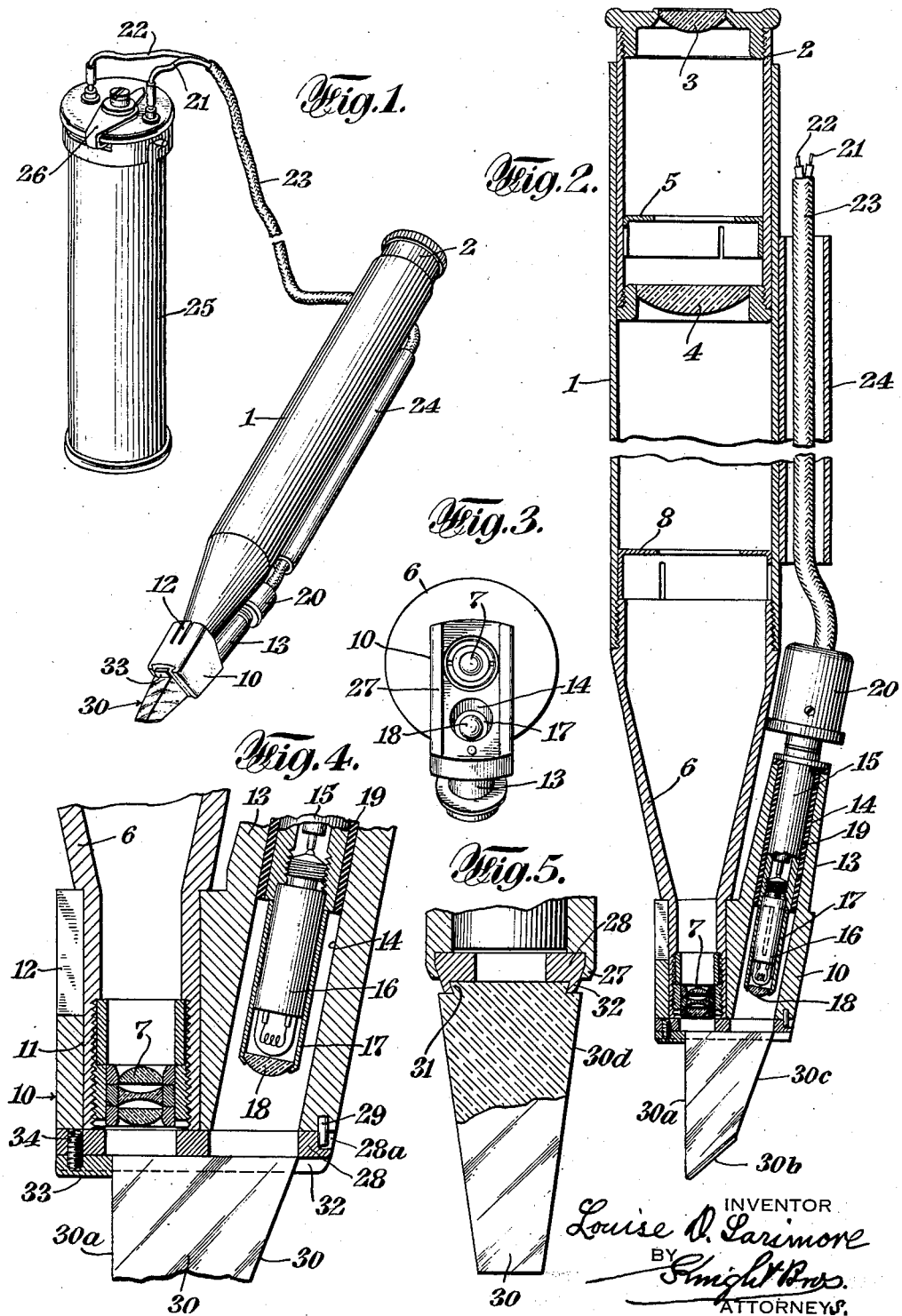

2,102,274

UNITED STATES PATENT OFFICE 2,102,274

MICROSCOPE FOR PATHOLOGICAL RESEARCH

Louise D. Larimore, New York, N. Y.

Application June 29, 1934, Serial No. 732,962

3 Claims. (Cl. 128—6)

The object of the present invention is to produce an improved portable pathological microscope of high magnification carrying its own illuminating means and provided with a contact member designed to be inserted into living tissue for rapid diagnosis to give a view of a cross-section of the tissue in its place in the body and thereby avoid the necessity of removing a piece of tissue for the usual frozen section or other biopsy technic, with the resulting cutting down of the time required for microscopic examinations and allowing the rapid inspection of several areas. The contact member of the improved pathological microscope is so constructed and arranged that a predetermined area of its contact surface is at or near the principal focus of the microscope so that when said predetermined area is placed in close contact with any opaque object that it is desired to examine, a clear image is transmitted to the eye of the observer.

To this end the present invention comprises an unmounted microscope drawtube with the eyepiece above and the objective below,—either or both of which may be adjustable, if desired,—and an extension tube below the objective which carries the contact member preferably in the form of a forwardly pointed wedge-shaped reflecting prism designed to be inserted into living tissue. This contact member in the form shown on the drawing has a contact surface parallel with the line of vision through the microscope and a reflecting surface or mirror at its free end arranged at an angle of 45° to the contact surface and in the line of vision to present an image in the microscope of the surface under examination. An illuminating electric lamp,—such as an opthalmoscopic lamp bulb,—is arranged in a chamber exterior to the microscope alongside of the objective to direct the light rays through the base of the contact member against the reflecting surface or mirrior which thereby illuminates the surface under examination through the contact face, the lines of vision and illuminating light rays acting upon the same reflecting surface or mirrior. With this arrangement, the light rays do not fall directly upon or enter the front lens of the objective and all objectionable reflections are eliminated. The solid contact member arranged between the objective lens and the object under examination maintains a proper focus by reason of its contact; the wedge-shape of said member holding the contact or focal surface in the plane of least movement against the surface of the object under examination.

In order that the invention may be fully understood it will first be described with reference to the accompanying drawing and the novelty afterwards pointed out in the annexed claims.

In said drawing,

Figure 1 is a perspective view of the improved compound microscope connected through suitable conductor with a source of lighting current shown in the form of a dry battery with controlling rheostat;

Figure 2 is an enlarged longitudinal sectional view of the improved compound microscope;

Figure 3 is an end view of the same with the contact member removed showing the objective and the illuminating lamp;

Figure 4 is an enlarged detail view similar to part of Figure 2 showing the relative arrangement of objective and illuminating lamp; and Figure 5 is an enlarged detail view partly in section showing the focusing wedge-shaped contact member.

I is a tubular body or drawtube of a compound microscope having the adjustable tubular eyepiece 2 telescoping in its upper end and carrying the lenses 3, 4 and the intervening diaphragm 5. Body tube I has attached to its end opposite the eyepiece a contracted or conical extension member 6 supporting in its reduced end the objective lenses indicated at 7 secured in a fixed focal position, a diaphragm member 8 being arranged in the tube I in the usual manner.

The contracted lower end of the microscope in which the objective lenses 7 are mounted is cylindrical in shape and has removably mounted upon it a head member 10 formed with a longitudinal socket 11 fitting snugly the cylindrical extension end of the microscope body. An integral spring tongue 12 of the head yieldingly holds it in place.

The head 10 is also formed with a slightly tapered rearwardly projecting tubular casing 13 presented alongside of the tapered portion 6 of the microscope body, the bore 14 of this tubular casing extending through the head 10 at a slight angle, approximately parallel with the tapered surface of the portion 6 of the body. Mounted in the bore 14 of the rearward extension 13 is small cylindrical lamp socket 15 in which is detachably screwed the electric lamp bulb 16 enclosed by a tubular casing 17 carrying at its forward end a magnifying lens 18. The location of illuminating lamp 16 with its lens 18 is slightly within the end of the bore 14 to avoid the possibility of any light rays falling directly upon or entering the objective lenses. The lamp socket member 15 is insulated from its support 13 by a tubular member 19 of insulating material, the socket member and insulating tube having flanged ends which engage each other with the flange of the insulating material contacting with the inner end of the member 13.

20 is an insulated connector or coupling of any suitable construction for attaching the current wires 21, 22 of the conductor 23 to the insulated terminals of the lamp socket 15 in the usual manner. The current conductor 23 is preferably passed through a tubular guide 24 secured to the body of the microscope and from there may extend to any proper source of lighting current such as the dry cell 25 having rheostat controlling switch arm 26 as shown in Figure 1.

The outer end face of the head 10 is preferably formed with undercut flanges 27 to receive the dovetail base 28 of the focusing contact member 30, a stop pin 29 projecting from the face of the inner head 10 and engaging a recess 28a in the inner face at one end of the dovetail base for determining the normal position of the contact member upon the head.

The contact member is preferably a wedge-shaped prism of clear glass having a contact surface 30a extending parallel with the line of vision through the microscope and a reflecting surface or mirror 30b at the sharpened tip projecting at 45° to the surface 30a, the remaining edge surface 30c and side faces 30d tapering slightly to the relatively thick base which is dovetailed as shown at 31 to detachably engage the undercut flanges 32 of the dovetail base 28 above referred to. A stop plate 33 secured by screw 34 fits the dovetail channel between undercut flanges 27 to properly position the member 30 in the base 28.

When the microscope is in use the line of vision through the microscope is parallel with the contact face 30a to the reflecting surface or mirror tip 30b which reflects an image of that portion of the surface of the object under examination which is covered by a predetermined area of surface 30a at or near the principal focus of the objective. At the same time the current of proper strength having been switched to the illuminating lamp 16, the rays from the lamp will be thrown on to the reflecting surface or mirror 30b and from that deflected against the surface under examination.

In operation it is intended that the whole instrument be held in the hand and thereby placed against the object to be diagnosed although it will, of course, be clear that a stand or floor bracket with proper universal joints between sections can be used where it is thought more desirable to support the microscope more steadily during the examination. The improved compound microscope is of importance from a practical standpoint because of its portability and high magnification. The instrument is kept in focus by contact of the glass prism contact member, the wedge-shape of this contact member, when inserted in live tissue, serving to maintain this proper focusing contact. Loss of focus through motion is negligible because of the balance of the instrument and the fact it is held against the object under examination, and the view is from the side edge of the contact member. There is no glare and moisture does not interfere with the vision.

The line of vision through the improved microscope is bent at right angles in the glass contact member for the purpose of getting a view of the tissue perpendicular to the surface exactly as is done when a section of tissue is removed and mounted on a glass slide, an essential in the nature of the case to a proper diagnosis of cancer. The idea of inserting the microscope tip or contact member into the live tissue in the patient's body is thought to be new in the present invention. Another important reason for the improved structure is the maintenance of the proper focus of the microscope when inserting the wedge-shaped contact tip into the tissue whose focal surface is the plane of least movement of the contact member.

The contact member may be separately removable for sterilizing, or the head member carrying the contact member may be removed as a unit and sterilized separately from the microscope.

I claim:—

1. In a compound microscope, the combination with a tubular body, an eyepiece, and an objective, of a wedge-shaped transparent contact member projecting from said tubular body and having a contact surface parallel with the line of vision and a reflecting surface in the line of vision constructed and arranged to totally reflect light rays from said contact surface to the objective of said compound microscope, and an illuminating lamp arranged alongside of and screened from said objective in position to direct its light rays to said contact surface by total reflection from said reflecting surface.

2. In combination with a compound microscope, a transparent contact member attached to the objective of said microscope and having two sides which form a wedge for penetrating an object to be sighted, one of said sides providing a surface to contact said object and the other of said sides providing an internal reflecting surface arranged in the line of vision of said microscope and inclined to said contact surface approximately at the total reflection angle, the front principal focus of said objective being disposed within said contact member and centrally with respect to a predetermined area of the contact surface.

3. A microscope having a transparent contact member attached to the objective end thereof, said contact member having a contact surface offset from the optical axis of the lens system of the microscope and a reflecting surface traversing such optical axis and the plane of said contact surface at an angle of approximately total reflection, to direct light from an object in contact with said contact surface into the lens system for obtaining a bright focused image of said object.

LOUISE D. LARIMORE.